Patented Jan. 2, 1923.

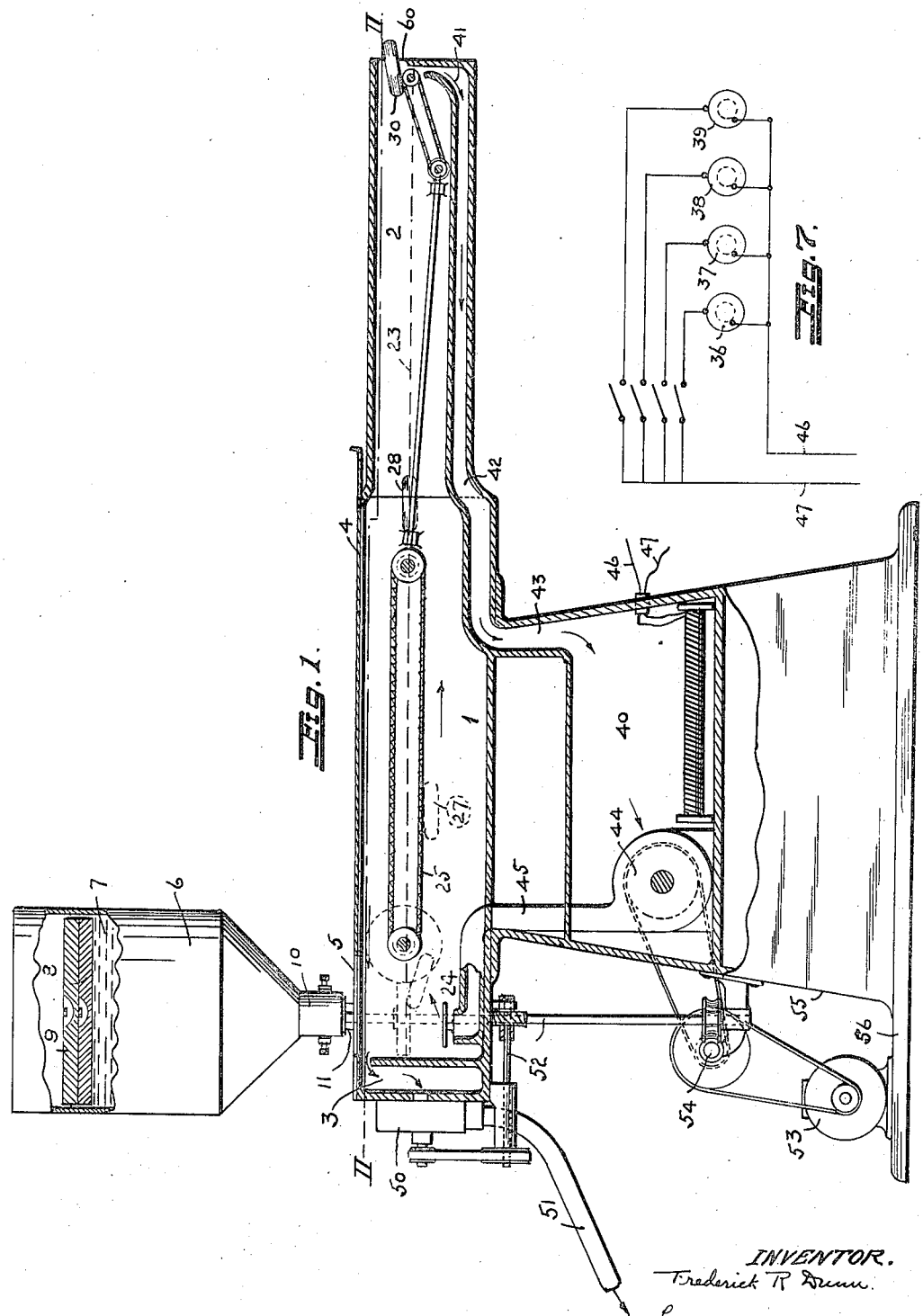

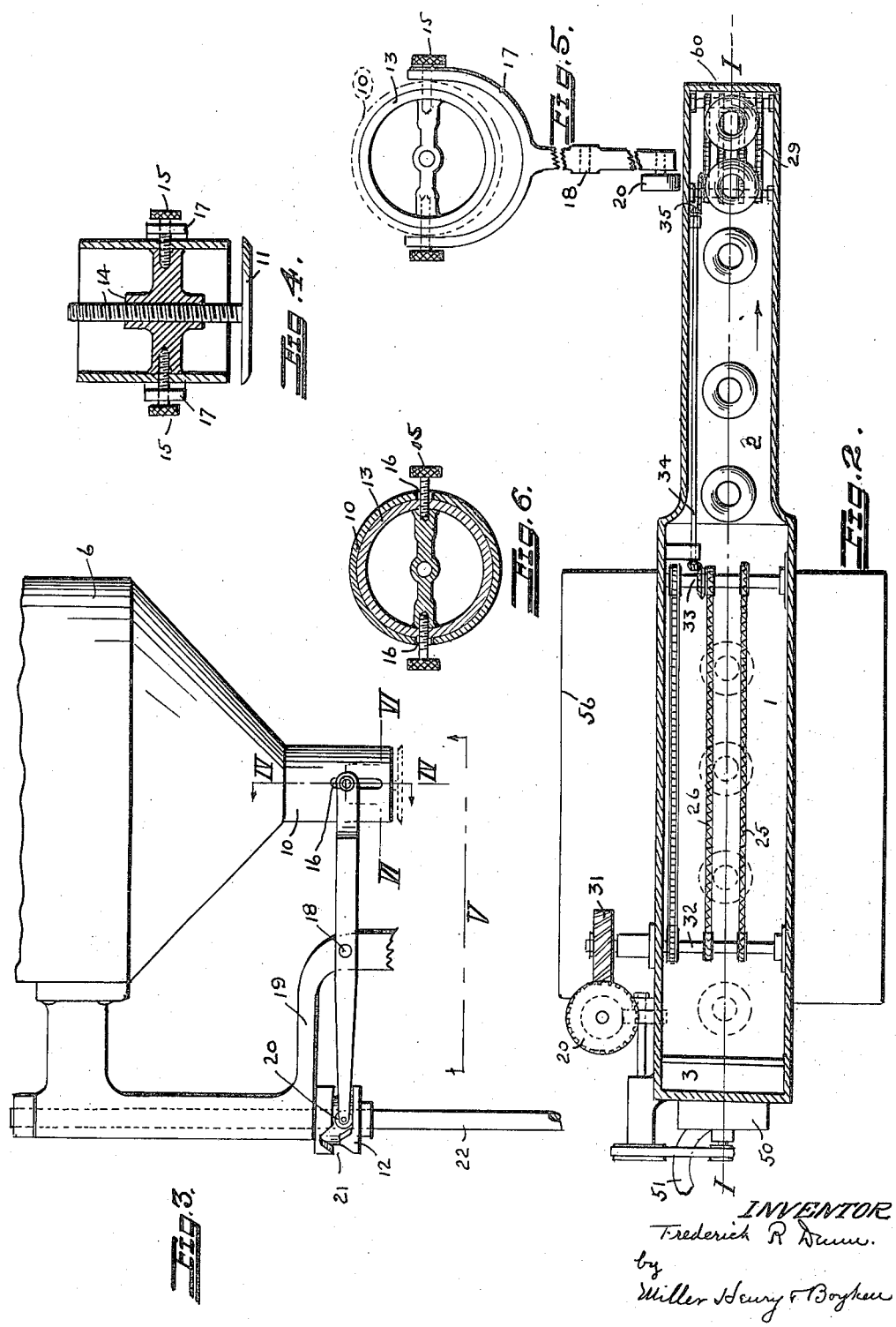

1,440,663

UNITED STATES PATENT OFFICE.

FREDERICK R. DUNN, OF ALAMEDA, CALIFORNIA.

MACHINE FOR COOKING DOUGHNUTS OR THE LIKE.

Application filed September 28, 1921. Serial No. 503,954.

*To all whom it may concern:*

Be it known that I, FREDERICK R. DUNN, a citizen of the United States, and resident of the city and county of Alameda, State of California, have invented new and useful Improvements in Machines for Cooking Doughnuts or the like, of which the following is a specification.

My invention has for its object a simple and efficient machine for the forming and cooking of doughnuts or the like while preventing any disagreeable odors from the cooking. A further object is simplicity and security of operation, minimum floor space required and one in which all the cooking is done within a closed chamber within which the hot grease is maintained. A further object is to cook the doughnuts submerged instead of floating as in most machines heretofore. A further object is means for feeding and regulating the weight of and cutting off of the dough for each doughnut. Further objects will appear from the drawings and specifications which follow.

In the accompanying drawings—

Fig. 1 is a longitudinal section through a machine of my invention on the line I—I of Fig. 2.

Fig. 2 is a plan view of Fig. 1 with the cover removed.

Fig. 3 is an end view of the lower part of the dough container and cutter mechanism.

Fig. 4 is a detail of the adjustable cutter valve on the section line IV—IV of Fig. 3 and at right angles thereto.

Fig. 5 is a plan view of Fig. 4.

Fig. 6 is a plan section of the spout of the dough container of Fig. 3 on the line VI—VI thereof.

Fig. 7 is a diagrammatic showing of the electric circuit connections for heating the grease.

Throughout the figures similar numerals refer to identical parts.

The longitudinal cooking compartment is shown by the numeral 1 and is provided with an extension barrel 2 at one end and a smoke flue 3 at the other end. A sliding cover 4 normally closes the cooking compartment except for the opening 5 through which the doughnut before cooking is introduced from the hopper 6. This hopper is filled with dough as 7 on the upper surface of which are placed weights in any requisite number as 8, 9. These cause a downward pressure of the dough so that it emerges as an annulus from the spout 10 whenever the valve 11 is opened and closed through the action of the cam member 12. The valve 11 is adjustably mounted in the cage or sleeve 13 as by the screw thread and socket at 14 and the said sleeve is adapted to slide within the spout 10. The sliding movement is effected through the trunnions 15, 15, passing through the slots 16, 16 in the said sleeve, the trunnions in turn being operated by the lever 17 pivoted at 18 on the stationary arm 19. On the opposite end of the lever 17 is the roller 20 traveling in the cam slot 21 of the cam member 12. The cam member 12 is rotated by the shaft 22 as described below. When the formed doughnut falls from the spout 10 through the opening 5 its inertia carries it below the surface of the hot grease at 23 and the velocity of the hot grease in the direction of the arrow 24 carries the doughnut under the traveling chains 25, 26. These travel also in the direction of the arrow 24 so that the doughnut is cooked while submerged in the hot grease and while traveling under the chains 25, 26 as indicated by the dotted lines of 27. When it is released from under the chains it floats to the surface as shown in the dotted position 28. The doughnut now floats on the circulating grease to the chains at 29 whereby it is picked up and carried above the level of the grease 23, and is now delivered from the spout at 30 as a hot completely cooked and formed doughnut at 60. The chains 25 and 26 and 29 are driven from the shaft 22 through the gears 31, shaft 32, second shaft and gears.

The grease in the cooking compartment 1 is kept at the proper temperature by suitable heating elements 36, 37, 38, and 39 mounted in the compartment 40, into which compartment the grease overflows as indicated by the arrow 41 and thence back through the duct 42, 43, into the compartment 40 from which it is picked up by the rotary pump 44 and again delivered into the cooking compartment 1 through the pipe 45.

The heat control of the chamber 40 and of the grease is effected through varying the energization of the electric heating units 36 to 39 or by cutting out one or more of these as by the several switches in the circuit 46, 47, see Fig. 7.

The odors, gases and smoke from the hot grease and cooking doughnuts is conveyed through the smoke flue 3 by the fan 50 and thence through the hose or flexible pipe 51 to the outer air, thereby causing an indraft at 5 and 50. The fan is operated from the shaft 52 through suitable gearing and connections from the motor 53 which latter also drives the shaft 22 and the pump 44 as from the common countershaft 54.

The entire machine is preferably mounted on a pedestal and base plate 55, 56, respectively.

While I have shown and described but one form of machine involving my invention it will be understood that the invention may be copied in various forms to suit the taste or requirements of individual builders or users without departing from the spirit of my invention and I wish to be understood as claiming all such variations.

I claim:

1. In a cooking machine a substantially closed cooking compartment having inlet and outlet openings and means for periodically delivering a measured quantity of dough or the like through said inlet, an exhaust duct from said compartment adapted to convey odors and the like clear of said machine and means for heating said compartment comprising a sump for grease, heating units in said sump and a plurality of passages between the compartment and the sump for the circulation of grease therebetween.

2. A cooking machine comprising parts as set forth in claim 1 and a pump adapted to circulate the grease.

3. In a cooking machine, a substantially closed cooking compartment having inlet and outlet openings and means for periodically delivering a measured quantity of dough or the like through said inlet, an exhaust duct from said compartment adapted to convey odors and the like clear of said machine and a mechanically operated conveyor by which the dough is caused to travel through the compartment and be delivered from the outlet after definite cooking period, a sump and circulating ducts between said sump and the compartment, heating units in said sump and a pump to effect circulation, said sump, ducts, pump and container constructed and adapted to contain and circulate hot grease, and means for heating said grease.

4. A cooking machine as set forth in claim 3 wherein the circulating ducts are positioned to maintain the grease at a definite level in the container and wherein the conveyor is positioned to transfer the dough through the compartment while submerged below said level.

5. A cooking machine as set forth in claim 3 wherein the ducts are positioned to maintain the grease at a definite level in the container and wherein the conveyor is positioned to transfer the dough through the compartment while submerged below said level and wherein said means for heating comprises electric heating units within said sump and energizing and controlling connections therefor.

FREDERICK R. DUNN.